United States Patent [19]

Gladstone et al.

[11] 4,076,918

[45] Feb. 28, 1978

[54] CELLULOSE THIOCYANATE AND PROCESS FOR PREPARING THE SAME

[75] Inventors: Shaul Gladstone, Arden; Clifton R. Neumoyer, Newark, both of Del.

[73] Assignee: Argus Chemical Corporation, Brooklyn, N.Y.

[21] Appl. No.: 549,420

[22] Filed: Feb. 12, 1975

[51] Int. Cl.² ............................................. C08B 3/00
[52] U.S. Cl. .............................. 536/59; 260/DIG. 24
[58] Field of Search ........................... 260/215; 536/59

[56] References Cited

U.S. PATENT DOCUMENTS

| 2,086,419 | 7/1937 | Hunt et al. | 260/215 |
| 3,527,810 | 9/1970 | Pettitt | 260/215 |
| 3,544,555 | 12/1970 | Biritz | 260/215 |

FOREIGN PATENT DOCUMENTS

| 8,351 | 10/1922 | Netherlands | 260/215 |
| 123,784 | 2/1919 | United Kingdom | 260/215 |

OTHER PUBLICATIONS

Klein et al., Industrial and Engineering Chemistry, vol. 50, pp. 80–82 (Jan. 1958).
Carson et al., Journal American Chemical Society, vol. 70, No. 6, Jun. 1948, pp. 2220–2223.
Chemical Abstracts, vol. 16, No. 2, 1/20/22, pp. 340–341.
Chemical Abstracts, vol. 7, No. 12, 6/20/1913, pp. 2112–2113.
Chemical Abstracts, vol. 65, No. 12, 12/5/1966, p. 18823a.

Primary Examiner—Ronald W. Griffin

[57] ABSTRACT

A process is provided for preparing cellulose thiocyanate by direct reaction of cellulose with thiocyanic acid in the presence of dimethyl formamide, or dimethyl sulfoxide, at elevated temperatures, the thiocyanic acid being formed in situ from a thiocyanate salt and sulfuric acid. The product, cellulose thiocyanate, has a carbon content of from 38% to 44.4%, a nitrogen content of from 0.1% to 6.3%, a sulfur content of 0.23% to 14.5%, and is noninflammable and self-extinguishing.

5 Claims, No Drawings

CELLULOSE THIOCYANATE AND PROCESS FOR PREPARING THE SAME

Cellulose is capable of forming esters and ethers in which the hydroxyl hydrogen atoms are partially or completely replaced by ester or ether groups. The entire hydroxyl group can also be removed and replaced by another group, in which event the product is referred to as a dioxy cellulose derivative. Such compounds can be prepared by removal of ester groups in their entirety, and replacement by other groups.

Various types of ester groups have been introduced into the cellulose molecule by reaction of cellulose with inorganic and organic acids. Cellulose is resistant to esterification, however, and it is difficult with many acids to introduce more than one ester group per anhydroglucose unit. Even limited introduction of ester groups requires special treatment conditions and, usually, an acid catalyst such as sulfuric acid. Sulfuric acid is thought by some to combine with the cellulose first, and to be replaced in due course by the other esterifying group being introduced by a transesterification reaction. The final ester may contain sulfuric acid ester groups, and these have to be removed.

Even under these conditions, the cellulose molecule is not reactive with a large number of acids. In order to introduce non-reactive acid groups into the cellulose molecule as ester groups, therefore, it is necessary to start out with a cellulose ester, such as cellulose nitrate, and transesterify, to replace one ester group by another. In this way, cellulose acetates, nitrates and tosylates have been prepared containing, for example, thiocyano and thiocarboxylic acid esterifying groups. Since, however, it is normally impossible to fully transesterify all of the ester groups on the starting cellulose ester, the resulting products are mixed esters, containing both ester units from the starting ester, and the groups introduced in the course of the transesterification reaction. Thus, cellulose thiocyanate has not been obtained by this procedure, but only cellulose nitrate-thiocyanate, cellulose acetate-thiocyanate, and cellulose tosylate-thiocyanate.

Thus, Lishevskaya et al., Vysokomolekul. Soedin., Khim. Svoistva Modifikatsiya Polimerov, Sb. Statei 1964, 243–7 treated cellulose nitrate with potassium thiocyanate in acetone or cyclohexanone at 120° C for 24 hours, recovering thiocyano cellulose nitrate, in which from 28.4 to 29.1% of the nitro groups were substituted by thiocyano groups.

Lishevskaya et al. sought to eliminate the nitro groups remaining in the mixed ester reaction product by saponification with an alcoholic solution of potassium bisulfide at 40° C. for 4½ hours, but this hydrolysis is not capable of completely eliminating nitro groups from the cellulose, and Lishevskaya did not claim that it did.

Maiboroda et al. *Khim. Volokna* 1967(1), 49–51 reacted cellulose diacetate in acetone containing 12 grams of potassium bromide with ammonium thiocyanate, obtaining cellulose acetatethiocyanate.

Carson et al. *Jour. Amer. Chem. Soc.*, 70 2220 (1948) reacted cellulose tosylate with sodium thiocyanate in acetonyl acetone at 110° to 112° C., but in this instance the entire tosylate group was apparently replaced by thiocyanate.

Borglin, U.S. Pat. No. 2,392,359 dated Jan. 8, 1946, prepared cellulose bis (thiocyanoacetate) by reaction of cellulose bis (chloroacetate) with sodium thiocyanate and acetone. The compound was said to be an insecticide.

It has also been proposed that cellulose be dissolved in aqueous thiocyanate solutions. Williams, *J. of the Soc. Chem. Ind.*, 40 221-4T (1921), dissolved cellulose in concentrated aqueous calcium thiocyanate. This solution can be spun to produce cellulose fibers, and the cellulose is apparently recovered from the solution quite unchanged. There is no suggestion that a thiocyanate derivative is formed.

In accordance with the invention, a process is provided for forming cellulose thiocyanate by direct reaction of cellulose with thiocyanic acid in the presence of formamide, or dimethyl sulfoxide, at elevated temperatures, the thiocyanic acid being formed in situ from a thiocyanate salt and sulfuric acid. The product, cellulose thiocyanate, appears not to have been previously prepared, and is believed to contain the thiocyanate group in substitution for one or more of the hydroxyl groups. There appears to be approximately one thiocyanate group per anhydroglucose unit in the cellulose molecule, suggesting that the thiocyanate group may be attached to the carbon of the methylol group of the cellulose, but there has been no evidence adduced elucidating that this is in fact the substitution position of the thiocyanate group on the cellulose molecule.

The cellulose thiocyanate of the invention has the following characteristics:

| | |
|---|---|
| Carbon content | 38.00 – 44.40% |
| Nitrogen content | 0.10 – 6.30% |
| Sulfur content | 0.23 – 14.50% |
| Flammibility | Self-extinguishing |
| Solubility | Insoluble in cold water, sparingly soluble in hot water; insoluble in aromatic solvents such as toluene and xylene, aliphatic solvents, such as hexane and alcohols, and heterocyclic solvents such as dioxane, pyridine and piperidine. |

The cellulose thiocyanate's lack of flammability and its ability to impart self-extinguishing properties to other solids make it useful as a flame retardant for plastics, fibers and films, textiles, and other flammable materials.

The reaction of the process of the invention is believed to proceed in accordance with the following scheme:

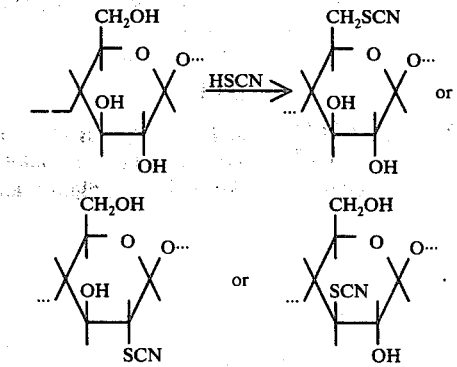

The reaction proceeds at elevated temperatures, above approximately 80° C. A satisfactory reaction rate is obtained at temperatures within the range from about 90° to about 180° C. Normally, there is no need to exceed 120° C. At temperatures in excess of 180° C., decomposition of the starting materials and/or of the reaction products may occur, and this therefore represents a practical upper limit on reaction temperature.

The reaction is normally complete in less than ten hours. At the more elevated temperatures it can be complete in as little as a ½ hour. Usually from one to six hours are sufficient.

Any cellulosic material can be used as the source of natural cellulose. Cellulose fibers such as cotton linters can be used, as well as cellulose pulp.

In this reaction, the dimethyl formamide or dimethyl sulfoxide serves as an inert solvent or dispersing phase in which the cellulose thiocyanate and sulfuric acid are homogeneously or heterogeneously dispersed.

The concentrations of the cellulose and thiocyanic acid in the reaction mixture are not critical. The mixture can contain a minimum of 3% reactants. The maximum is not critical, and is determined by the amount of reactants which make efficient agitation impossible. Total reactant concentrations of up to 30% are easily attainable.

Sulfuric acid is used with a thiocyanate salt to form thiocyanic acid in situ in the reaction mixture, and to act as a catalyst. The mole ratio of $H_2SO_4$ to MSCN (M is a cation) should be $\geq 0.5$.

Any water-soluble thiocyanate salt can be used. Ammonium thiocyanate, sodium thiocyanate, and potassium thiocyanate are readily available, and are usually employed, but other thiocyanates, such as calcium thiocyanate, barium thiocyanate, strontium thiocyanate, zinc thiocyanate, and magnesium thiocyanate, can also be used. It is also possible to use thiocyanic acid, if available.

Since one mole of the thiocyanic acid reacts with one hydroxyl of one anhydroglucose unit of the cellulose, at least one mole thiocyanate is present in the reaction mixture per anhydroglucose unit. The thiocyanate can advantageously be used in excess, to ensure that the reaction proceeds to completion, with substitution of at least one hydroxyl group per anhydroglucose unit of cellulose.

The cellulose thiocyanate product obtained is a powder, which can be separated from the reaction mixture by filtration, and then washed with cold water to remove residual salts and liquids. The washing can be followed by hot water extraction to recover the cellulose thiocyanate, which is sparingly soluble in hot water. After extraction with boiling water, the extract can be cooled, recovering cellulose thiocyanate by precipitation from the resulting solution.

The following Example is illustrative.

EXAMPLE

To 15 grams (0.0925 mole) of cellulose (medical grade absorbent cotton) were added 200 ml of dimethyl formamide, 30 grams (0.394 mole) of ammonium thiocyanate and 25 ml (0.44 mole) of concentrated sulfuric acid. The mixture was stirred, and held at 110° C. for 6 hours.

The cellulose thiocyanate-containing product, a brownish white powder, was separated in a Buchner funnel, and thoroughly washed with cold water until all salts and liquids had been washed out. The residue was then extracted with hot boiling water for 72 hours in a Soxhlet extractor. The cellulose thiocyanate was dissolved in water, and recovered by precipitation by cooling the extract solution. The residue in the Soxhlet was sulfur.

The cellulose thiocyanate recovered by precipitation from the extract was a translucent white solid having the following analysis:

| Carbon content | 38.00 – 44.40% |
| --- | --- |
| Nitrogen content | 0.10 – 6.30% |
| Sulfur content | 0.23 – 14.50%[1] |
| Flammability | Self-extinguishing |

[1]Corresponding to 0.015 to 1 SCN group per anhydroglucose unit of the cellulose, or a degree of substitution of 0.015 to 1.

Having regard to the foregoing disclosure, the following is claimed as the inventive and patentable embodiments thereof:

1. Cellulose thiocyanate having from 0.015 to 1 SCN group per anhydroglucose unit of the cellulose and no other esterifying groups, and having the following characteristics:

| Carbon content | 38.00 – 44.40% |
| --- | --- |
| Nitrogen content | 0.10 – 6.30% |
| Sulfur content | 0.23 – 14.50% |
| Flammability | Self-extinguishing |
| Solubility | Insoluble in cold water, sparingly soluble in hot water; insoluble in aromatic solvents, aliphatic solvents, alcohols, and heterocyclic solvents. |

2. A process for preparing cellulose thiocyanate having from 0.015 to 1 SCN group per anhydroglucose unit of the cellulose and no other esterifying groups which comprises reacting cellulose with thiocyanic acid in the presence of a member selected from the group consisting of dimethyl sulfoxide and dimethyl formamide, at a temperature at which the reaction proceeds to form cellulose thiocyanate.

3. A process in accordance with claim 2, in which the thiocyanic acid is formed in situ by reaction of a thiocyanate salt with sulfuric acid.

4. A process in accordance with claim 3, in which the thiocyanate salt is ammonium thiocyanate.

5. A process in accordance with claim 2, in which the reaction is carried out at a temperature within the range from about 80° to about 180° C.

* * * * *